(12) United States Patent
Vigholm et al.

(10) Patent No.: US 11,846,086 B2
(45) Date of Patent: Dec. 19, 2023

(54) HYDRAULIC SYSTEM AND A METHOD FOR CONTROLLING A HYDRAULIC SYSTEM OF A WORKING MACHINE

(71) Applicant: VOLVO CONSTRUCTION EQUIPMENT AB, Eskilstuna (SE)

(72) Inventors: Bo Vigholm, Stora Sundby (SE); Johan Hallman, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 25 days.

(21) Appl. No.: 17/784,658

(22) PCT Filed: Dec. 12, 2019

(86) PCT No.: PCT/EP2019/084803
§ 371 (c)(1),
(2) Date: Jun. 12, 2022

(87) PCT Pub. No.: WO2021/115598
PCT Pub. Date: Jun. 17, 2021

(65) Prior Publication Data
US 2023/0011283 A1  Jan. 12, 2023

(51) Int. Cl.
*E02F 9/22* (2006.01)
*F15B 11/17* (2006.01)
(Continued)

(52) U.S. Cl.
CPC ............ *E02F 9/2235* (2013.01); *E02F 9/225* (2013.01); *E02F 9/2217* (2013.01);
(Continued)

(58) Field of Classification Search
CPC .......... F15B 7/001; F15B 7/006; F15B 11/17; F15B 15/18; F15B 21/14; E02F 9/2217; E02F 9/2289; E02F 9/2292
See application file for complete search history.

(56) References Cited

U.S. PATENT DOCUMENTS

| 7,908,048 B2 * | 3/2011 | Vigholm | ................. F04B 17/03 701/41 |
| 9,074,347 B2 * | 7/2015 | Vigholm | ................. F15B 21/14 |

(Continued)

FOREIGN PATENT DOCUMENTS

| CN | 104364449 A | 2/2015 |
| DE | 102016217541 A1 | 3/2018 |

(Continued)

OTHER PUBLICATIONS

Chinese Office Action and English Translation, Chinese Application No. 201980102903.1, dated Jun. 5, 2023, 23 pages.

(Continued)

*Primary Examiner* — Michael Leslie
(74) *Attorney, Agent, or Firm* — Sage Patent Group

(57) ABSTRACT

A hydraulic system for a working machine, the system comprising: an electric machine connected to a first hydraulic machine and to a second hydraulic machine via a common axle, an output side of the second hydraulic machine being connected to an input side of the first hydraulic machine, wherein the first hydraulic machine is a variable displacement hydraulic machine with unidirectional flow; at least one hydraulic consumer hydraulically coupled to an output side of the first hydraulic machine via a supply line and configured to be powered by the first hydraulic machine; a first return line hydraulically coupling the hydraulic consumer to the input side of the first hydraulic machine.

15 Claims, 9 Drawing Sheets

(51) Int. Cl.
    *F15B 21/14*        (2006.01)
    *F15B 15/18*        (2006.01)

(52) U.S. Cl.
    CPC .......... *E02F 9/2228* (2013.01); *E02F 9/2267* (2013.01); *E02F 9/2271* (2013.01); *E02F 9/2289* (2013.01); *E02F 9/2292* (2013.01); *E02F 9/2296* (2013.01); *F15B 11/17* (2013.01); *F15B 15/18* (2013.01); *F15B 21/14* (2013.01); *F15B 2211/20576* (2013.01)

(56) References Cited

U.S. PATENT DOCUMENTS

| | | | | |
|---|---|---|---|---|
| 10,344,784 | B2* | 7/2019 | Peterson | F15B 1/033 |
| 10,927,867 | B2* | 2/2021 | Meitinger | E02F 9/2292 |
| 11,459,732 | B2* | 10/2022 | Vigholm | E02F 9/0841 |
| 11,512,716 | B2* | 11/2022 | Gerngross | F15B 7/006 |
| 11,635,095 | B2* | 4/2023 | Vigholm | B62D 5/064 60/327 |
| 2004/0211471 | A1 | 10/2004 | Toji et al. | |
| 2011/0030364 | A1 | 2/2011 | Persson et al. | |
| 2012/0055149 | A1* | 3/2012 | Vonderwell | F15B 7/006 60/486 |
| 2014/0033697 | A1 | 2/2014 | Opdenbosch | |
| 2015/0192149 | A1* | 7/2015 | Ma | E02F 9/2292 60/484 |
| 2015/0361996 | A1 | 12/2015 | Yuan et al. | |
| 2016/0084277 | A1 | 3/2016 | Morelius et al. | |
| 2016/0333903 | A1 | 11/2016 | Peterson et al. | |
| 2017/0114518 | A1 | 4/2017 | Zimmerman | |
| 2021/0372087 | A1* | 12/2021 | Vigholm | E02F 9/226 |

FOREIGN PATENT DOCUMENTS

| | | |
|---|---|---|
| EP | 3159456 A1 | 4/2017 |
| JP | 2002-054602 A | 2/2002 |
| WO | WO 2012/030495 A2 | 3/2012 |
| WO | 2017022868 A1 | 2/2017 |

OTHER PUBLICATIONS

International Search Report and Written Opinion of the International Searching Authority, PCT/EP2019/084803, dated Jul. 17, 2020, 13 pages.

Chinese Second Office Action and English Translation, Chinese Patent Application for Invention No. 201980102903.1, dated Aug. 31, 2023, 43 pages.

* cited by examiner

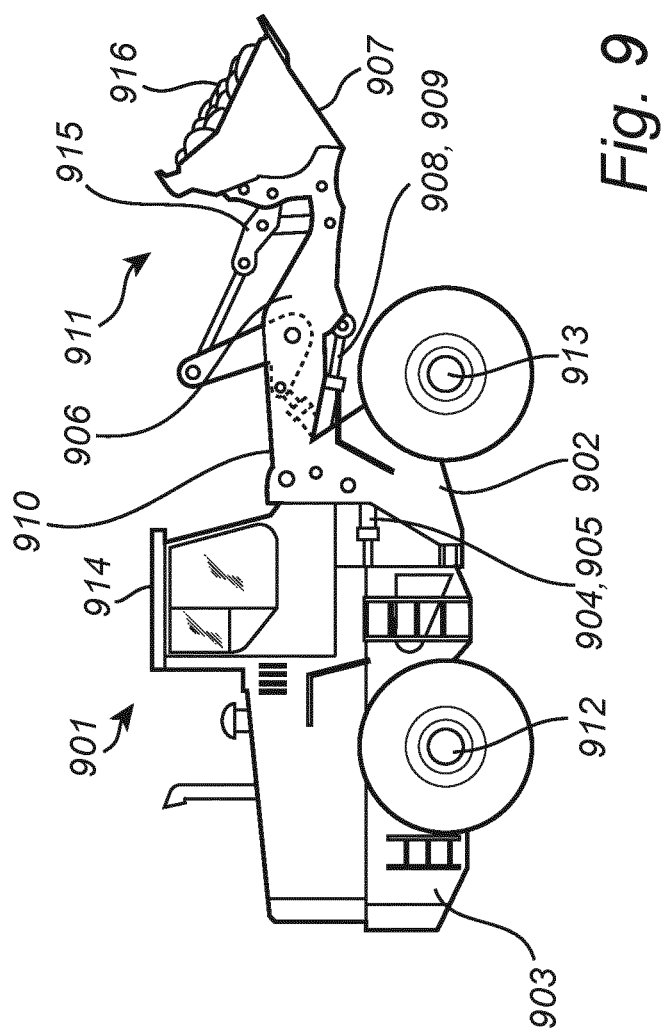

HYDRAULIC SYSTEM AND A METHOD FOR CONTROLLING A HYDRAULIC SYSTEM OF A WORKING MACHINE

CROSS REFERENCE TO RELATED APPLICATIONS

This application is a 35 U.S.C. § 371 national stage application of PCT International Application No. PCT/EP2019/084803 filed on Dec. 12, 2019, the disclosure and content of which is incorporated by reference herein in its entirety.

TECHNICAL FIELD

The invention relates to a hydraulic system and a method for controlling a hydraulic system of a working machine. In particular, the method and system relate to a hybrid drive system comprising an internal combustion engine and a plurality of electrical machines.

The invention is applicable on working machines within the fields of industrial construction machines or construction equipment, in particular wheel loaders. Although the invention will be described with respect to a wheel loader, the invention is not restricted to this particular machine, but may also be used in other working machines such as articulated haulers, excavators and backhoe loaders.

BACKGROUND

In connection with transportation of heavy loads, e.g. in construction work, work machines are frequently used. A work machine may be operated with large and heavy loads in areas where there are no roads, for example for transports in connection with road or tunnel building, sand pits, mines and similar environments.

Work machines commonly employ a hydraulic system for providing power to functions such as steering and lifting. The hydraulic system may for example be powered by the internal combustion engine via a power take-off connected to an output shaft of the engine.

To improve the fuel efficiency of the working machine, a hybrid hydraulic system can be used. One interesting approach is to provide a hydraulic hybrid system comprising an electrical machine for providing power to the hydraulic system. By combining the electric machine with an energy storage, energy can be recuperated and stored during certain operations to be used when required.

A typical wheel loader operation includes simultaneous operation with the two main subsystems of the motion system—driveline and work hydraulics. Since both systems are directly coupled to the engine shaft the interaction of the systems can be problematic.

Accordingly, it is desirable to further improve the efficiency of a hybrid hydraulic system.

SUMMARY

An object of the invention is to provide an improved electric hybrid hydraulic system for a working machine.

According to a first aspect of the invention, there is provided a hydraulic system for a working machine. The system comprises: an electric machine connected to a first hydraulic machine and to a second hydraulic machine via a common axle, an output side of the second hydraulic machine being connected to an input side of the first hydraulic machine, wherein the first hydraulic machine is a variable displacement hydraulic machine with unidirectional flow; at least one hydraulic consumer hydraulically coupled to an output side of the first hydraulic machine via a supply line and configured to be powered by the first hydraulic machine; a first return line hydraulically coupling the hydraulic consumer to the input side of the first hydraulic machine; wherein the second hydraulic machine is configured to provide a flow of hydraulic fluid from a hydraulic fluid supply to the input side of the first hydraulic machine if a requested flow from the first hydraulic machine exceeds a flow of the first return line.

That the electric machine is connected to the first and second hydraulic machines mean that an output shaft of the electric machine is mechanically connected to a respective input shaft of the hydraulic machines such that the electric machine may operate as either a motor providing power to the hydraulic machine or as a generator generating power received from the hydraulic machine. It can further be assumed that the electric machine is connected to an electrical power supply and/or energy storage. The common axle may in the present context be a single axle which is coaxially arranged with the electric machine and the first and second hydraulic machines. However, the common axle may also comprise intermediate gears and/or clutches while still being referred to as a common axle.

In the described system, a high degree of flexibility in terms of operation and energy recuperation and can be achieved using only one electric machine. It is possible to achieve the same or similar functionality using two electric machines with one electric machine connected to a respective hydraulic machine. However, both the power components required for controlling the electric machine and the machine itself may be expensive. Accordingly, in some applications it is desirable to have an electrical system with lower complexity, and by using the described configuration of hydraulic machines, a system which is of lower complexity can be provided.

The present invention is based on the realization that the described hydraulic system can be used to efficiently and flexibly recuperate energy using the second hydraulic machine if a return flow from a hydraulic consumer exceeds a requested hydraulic flow. Moreover, the described system offers flexibility in that it is also capable of providing an additional hydraulic flow from the second hydraulic machine to the first hydraulic machine, and via the first hydraulic machine to a hydraulic consumer., i.e. if the first hydraulic machine is not capable of providing the requested flow. A further advantage of the described system is that it offers redundancy in the hydraulic system, meaning that if one of the first and second hydraulic machines should malfunction, the hydraulic system can still be operated, even if it may be at reduced capacity. This may help an operator to finish a task in a safe manner and to reach a service location without the need for additional assistance or on-site repairs. Furthermore, additional electrical and hydraulic machines may be arranged in parallel to the described electrical and hydraulic machines to further extend the functionality and flexibility of the described system. By using two hydraulic machines it may also be possible to use smaller machines compared to if only one would be used, thereby providing an advantage in terms of system installation and integration.

According to one embodiment of the invention, the second hydraulic machine is a variable displacement hydraulic machine with bi-directional flow, the second hydraulic machine being further configured to recuperate energy if the requested flow from the first hydraulic machine is lower than the flow of the first return line. The second hydraulic machine can thereby operate in both flow directions to both receive a flow from the return line for energy recuperation and to provide a flow to the first hydraulic machine when the required flow from the first hydraulic machine is larger than the flow in the return line.

According to one embodiment of the invention, the hydraulic system further comprises a third hydraulic machine operatively connected to the common axle of the electric machine, wherein the second hydraulic machine is a variable displacement hydraulic machine with unidirectional flow configured to provide a variable flow from the output side of the second hydraulic machine, and wherein the third hydraulic machine is a variable displacement hydraulic machine with unidirectional flow having an input side connected to the output side of the second hydraulic machine and an output side connected to the hydraulic fluid supply, the third hydraulic machine being configured to recuperate energy if the requested flow from the first hydraulic machine is lower than the flow of the first return line. Thereby, the two functions of energy recuperation and providing an additional flow to the first hydraulic machine is handled by two separate hydraulic machines, where the second hydraulic machine provides an additional flow to support the first hydraulic machine while the third hydraulic machine is configured to recuperate energy. An advantage of such a system is that it may operate with a higher efficiency since the properties of the respective hydraulic machine can be more specifically selected based on the respective function. However, since two hydraulic machines may consume more space, the aforementioned embodiment using one hydraulic machine for both energy recuperation and to provide a supporting flow may be desirable if the overall volume of the system is an important design parameter.

The first hydraulic machine may also be configured to recuperate energy if a requested pressure from the first hydraulic machine is lower than a pressure in the first return line. Thereby, also the first hydraulic machine can be used for energy recuperation by providing power the first electric machine which will then function as a generator.

According to one embodiment of the invention the at least one hydraulic consumer comprises: a first hydraulic consumer connected to the first return line, and a second hydraulic consumer having a second return line directly connected to the input side of the first hydraulic machine, and wherein the first return line is connected from a first side of the first hydraulic consumer to the hydraulic fluid supply via a pressure limiter and to the input side of the first hydraulic machine via a valve arrangement allowing a flow from the first return line to the second return line, wherein the pressure limiter is configured to allow a flow from the first return line to the hydraulic fluid supply if the pressure in the first return line is lower than the pressure in the second return line, and if the pressure of the first return line is higher than a threshold pressure of the pressure limiter. Hence, the return line is connected to the second hydraulic machine with bi-directional displacement in the embodiment comprising two hydraulic machines, and to the second and third hydraulic machines with unidirectional displacement in the embodiment comprising three hydraulic machines.

According to one embodiment of the invention, the hydraulic system further comprises a return valve block connected to a first side of the second hydraulic consumer, the return valve block comprising a first return check valve arranged to allow a flow from the first side of the second hydraulic consumer to the second return line and a first control valve controlling the flow from the first side of the second hydraulic consumer to a second pressure limiter arranged between the first side of the second hydraulic consumer and the input side of the first hydraulic machine. By means of the return valve block, the return flow of hydraulic fluid from the second hydraulic cylinder can be controlled such that the flow is either provided to the input side of the first hydraulic machine or to the input side of the second hydraulic machine. The pressure limiter may for example be an electrically controllable pressure limiter and the control valve may be either of a variable valve or an on/off valve.

According to one embodiment of the invention, the hydraulic system further comprises a third hydraulic consumer having a first side connected to the return valve block, wherein the return valve block further comprises a second return check valve arranged to allow a flow from the first side of the third hydraulic consumer to the second return line and a second control valve controlling a flow from the first side of the third hydraulic consumer to the second pressure limiter. Thereby, also the return flow from the third hydraulic consumer can be controlled in the same manner as described above for the return flow from the second hydraulic cylinder.

According to one embodiment of the invention, the first hydraulic consumer is a steering cylinder, the second hydraulic consumer is a lift cylinder and the third hydraulic consumer is a tilt cylinder of a working machine. Thereby, the described hydraulic system can be used in a working machine such as a wheel loader, and the advantages of the hydraulic system results in more efficient operation of the working machine. There is also provided a working machine comprising a hydraulic system according to any one of the aforementioned embodiments.

According a second aspect of the invention, there is provided a method for controlling a hydraulic system for a working machine. The system comprises: an electric machine connected to a first hydraulic machine and to a second hydraulic machine via a common axle, an output side of the second hydraulic machine being connected to an input side of the first hydraulic machine, wherein the first hydraulic machine is a variable displacement hydraulic machine configured to provide unidirectional flow; at least one hydraulic consumer hydraulically coupled to an output side of the first hydraulic machine via a supply line and configured to be powered by the first hydraulic machine; a first return line hydraulically coupling the hydraulic consumer to the input side of the first hydraulic machine. The method comprises: detecting a return flow from the hydraulic consumer through the first return line; and controlling the second hydraulic machine to maintain a pressure in the first return line at a pressure level higher than a predetermined minimum pressure level. Depending on how the threshold level is defined, the condition for controlling the second hydraulic machine may also be to maintain a pressure in the first return line at a pressure level at least equal to a predetermined minimum pressure level.

The described hydraulic system comprising a first and a second hydraulic machine can advantageously be utilized to maintain a pressure in the first return line in order to facilitate more efficient energy recuperation. By means of the maintained pressure in the return line, the maximum rpm of the first hydraulic machine can be significantly increased. If the first hydraulic machine would be required to draw hydraulic fluid from the tank at atmospheric pressure, there would be an increasing risk for cavitation with increasing speed of the hydraulic machine. This in turn has the advantageous effect that the first hydraulic machine can be smaller while maintaining the same overall system performance. A smaller hydraulic machine is desirable since both the cost and the required installation volume is decreased.

Moreover, it is common in hydraulic systems to maintain a certain backup pressure for selected hydraulic functions to provide a smoother operation of e.g. a hydraulic actuator in the form of a steering cylinder. In conventional hydraulic systems, the described backup pressure introduces losses in the hydraulic system. However, since the described system can be operated to recuperate energy in the return line, it allows for a higher pressure in the return line, in turn leading to improved operation of hydraulic actuators, without adding losses to the system.

The detection of a pressurized flow from the hydraulic consumer may for example be achieved using one or more pressure sensors located at the hydraulic consumer. It is also possible to detect a return flow from the hydraulic consumer by means of identifying a control command provided to the hydraulic consumer since it may be known that a specific command under known circumstances gives rise to a return flow having known properties.

The pressure of the first return line may for example be monitored by means of a pressure sensor and the pressure can then be controlled by driving the second hydraulic machine based on an output signal of the pressure sensor. It is also possible to control the torque of the second electric machine, based on knowledge of the properties of the second hydraulic machine, thereby controlling the pressure in the first return line by means of the second hydraulic machine.

According to one embodiment of the invention. the method further comprises: determining a requested supply pressure from the first hydraulic machine; and if the return flow of the first return line is lower than the supply flow required by the first hydraulic machine, controlling the second hydraulic machine to provide a pressurized flow of hydraulic fluid from a hydraulic fluid supply to the input side of the first hydraulic machine. Thereby, the return flow can be maximally utilized and the second hydraulic machine provides the additional flow required. Moreover, the first hydraulic machine can provide a significantly higher total flow when the input side of the first hydraulic machine is pressurized. The second hydraulic machine draws hydraulic fluid from tank, but only the amount corresponding to the difference between the requested flow and the return flow. Accordingly, the amount of hydraulic fluid which needs to be pressurized by the first hydraulic machine, i.e. drawn from a non-pressurized source, is minimized which in turn improves the overall energy efficiency of the hydraulic system.

According to one embodiment of the invention, the method further comprises: determining a requested supply pressure from the first hydraulic machine; and if the return flow of the first return line is higher than the supply flow required from the first hydraulic machine, controlling the second hydraulic machine to recuperate energy by driving the electric machine as a generator. Thereby, energy can be recuperated in the second hydraulic machine if there is excess flow in the return line which is not required by the first hydraulic machine. To recuperate the energy, there is a flow through the second hydraulic machine from a high-pressure side to a low-pressure side and the second electric machine is driven as a generator. It is assumed that there is either an energy storage capability such that the electrical energy generated by the second electric machine can be stored, or that there is a power distribution functionality such that the generated electrical energy can be reused directly.

According to one embodiment of the invention, in a system further comprising a third hydraulic machine connected to the common axle of the electric machine, wherein the second hydraulic machine is a unidirectional variable displacement hydraulic machine configured to provide a variable positive displacement at the output side of the second hydraulic machine and wherein the third hydraulic machine is a unidirectional variable displacement hydraulic machine having an input side connected to the output side of the second hydraulic machine and an output side connected to the hydraulic fluid supply, the method further comprises: determining a requested supply pressure from the first hydraulic machine; and if the return flow of the first return line is lower than the supply flow required by the first hydraulic machine, controlling the second hydraulic machine to provide a pressurized flow of hydraulic fluid from a hydraulic fluid supply to the input side of the first hydraulic machine.

According to one embodiment of the invention, the method further comprises: determining a requested supply pressure from the first hydraulic machine; and if the return flow of the first return line is higher than the supply flow required from the first hydraulic machine, controlling the third hydraulic machine to recuperate energy by driving the electric machine as a generator. Also here, similarly to in previously described embodiments, the functions of recuperating energy and providing a flow to the first hydraulic machine is divided between the second and third hydraulic machines.

According to one embodiment of the invention, wherein the at least one hydraulic consumer comprises a first hydraulic cylinder connected to the first return line and wherein the hydraulic system further comprises second and third hydraulic cylinders connected to a return valve block configured and arranged to control the return flow direction from the second and third hydraulic cylinders to the second hydraulic machine, the return valve block being coupled to a second return line connected to the input side of the first hydraulic machine and to the input side of the second hydraulic machine, the return valve block being further coupled to a third return line connected to the low-pressure side of the second hydraulic machine, the method further comprises: controlling the return valve block based on operating properties of the first, second and/or third hydraulic cylinder such that energy is recovered by the second hydraulic machine.

According to one embodiment of the invention, wherein the at least one hydraulic consumer comprises a first hydraulic cylinder connected to the first return line and wherein the hydraulic system further comprises second and third hydraulic cylinders connected to a return valve block configured and arranged to control the return flow direction from the second and third hydraulic cylinders to the second hydraulic machine, the return valve block being coupled to a second return line connected to the input side of the first hydraulic machine and to the input side of a third hydraulic machine, the return valve block being further coupled to a third return line connected to an input side of the second hydraulic machine, the method further comprises: controlling the return valve block based on operating properties of the first, second and/or third hydraulic cylinder such that energy is recovered by the third hydraulic machine.

Further effects and features of this second aspect of the present invention are largely analogous to those described above in connection with the first aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 9 is a schematic illustration of a working machine comprising a hydraulic system according to an embodiment of the invention.

DETAILED DESCRIPTION OF EXAMPLE EMBODIMENTS OF THE INVENTION

In the present detailed description, various embodiments of a hydraulic system and a method for controlling a hydraulic system according to the present invention are mainly discussed with reference to a hydraulic hybrid system in a wheel loader, where the hydraulic consumers are illustrated as hydraulic cylinders. It should however be noted that this by no means limits the scope of the present invention since the described hydraulic system is equally applicable in other application and for other types of working machines.

Figure 1:
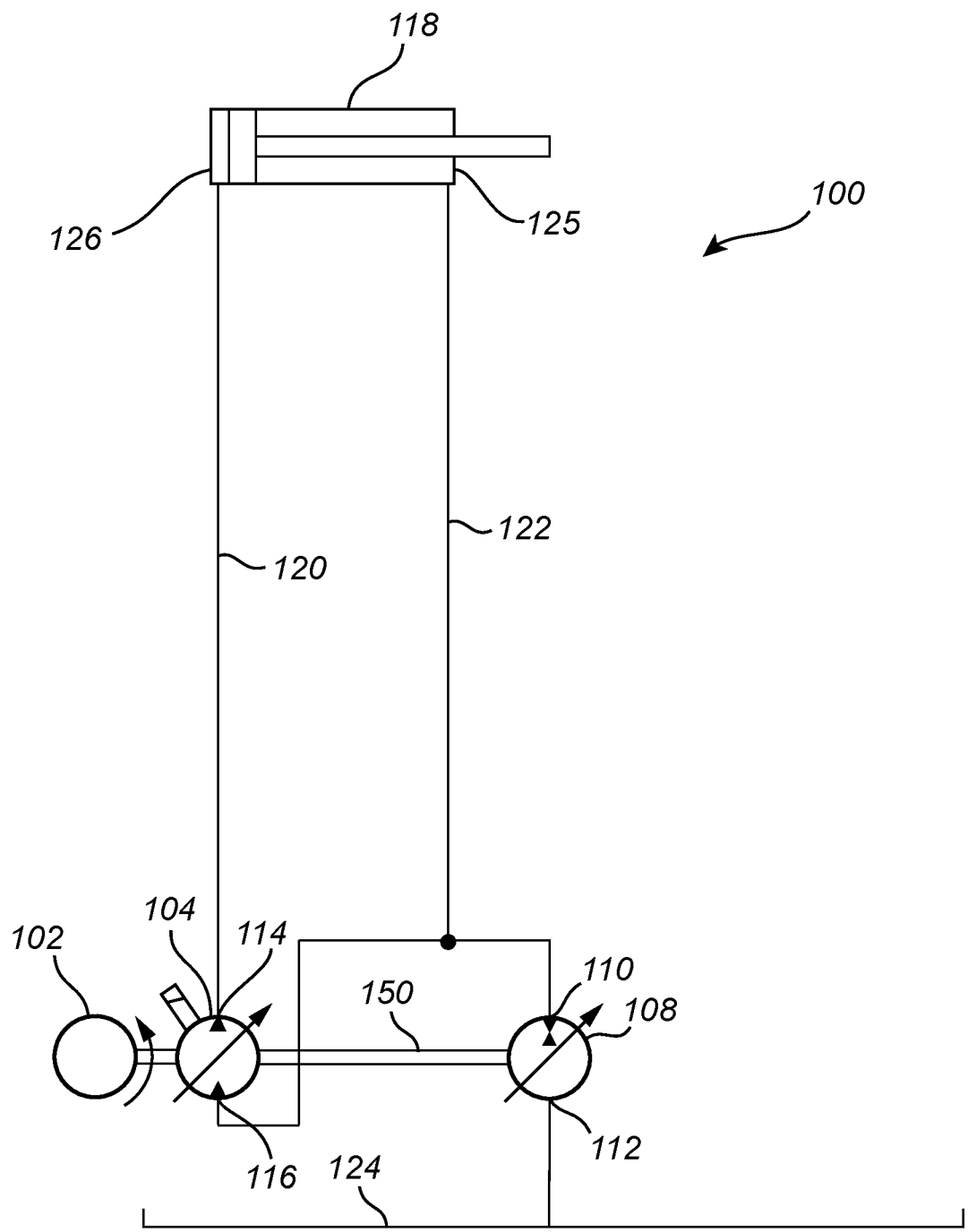
FIG. 1 is a schematic illustration of a hydraulic system according to an embodiment of the invention.

FIG. 1 schematically illustrates a hydraulic system 100 for a working machine. The system comprises an electric machine 102 connected to a first hydraulic machine 104 and to a second hydraulic machine 108 via a common axle 150. An output side 110 of the second hydraulic machine 108 is connected to an input side 116 of the first hydraulic machine 104, wherein the first hydraulic machine 104 is a variable displacement hydraulic machine with unidirectional flow. Thereby, the first hydraulic machine can have a displacement setting from 0% to 100%.

The hydraulic system 100 further comprises at least one hydraulic consumer 118 hydraulically coupled to an output side 114 of the first hydraulic machine 104 via a supply line 120 and hydraulic consumer 118 is configured to be powered by the first hydraulic machine. The hydraulic consumer 118 is here represented by a hydraulic cylinder 118 having a piston side 126 connected to the output side 114 of the first hydraulic machine 104 and a piston rod side 125 which is connected to a first return line 122 hydraulically coupling the hydraulic consumer 118 to an input side 116 of the first hydraulic machine 104.

In the described hydraulic system, the second hydraulic machine 108 is configured to provide a flow of hydraulic fluid from a hydraulic fluid supply 124 to the input side 116 of the first hydraulic machine 104 if a requested flow from the first hydraulic machine 104 exceeds a flow of the first return line 122.

Moreover, in the embodiment illustrated in FIG. 1, the second hydraulic machine 108 is a variable displacement hydraulic machine with bi-directional flow, the second hydraulic machine 108 being further configured to recuperate energy if the requested flow from the first hydraulic machine 104 is lower than the flow of the first return line 122. The input side 110 of the second hydraulic machine can thus be seen as an input/output side 110 in the described embodiment. The second hydraulic machine 108 may have a displacement setting between −100% and 100%.

The requested flow from the first hydraulic machine 104 may be based on a requested function from a vehicle operator, such as turning the vehicle, lifting a load, or any other operation requiring hydraulic power. The request is translated into a flow from the first hydraulic machine 104 and if there is a flow available in the first return line 122, the flow can be used by the first hydraulic machine 104. In another scenario, if there is a flow in the first return line 122 but not a corresponding need for the flow, the flow can be directed through the second hydraulic machine 108 which powers the electric machine 102 to act as a generator. The generated energy may for example be stored in an electrical energy storage or used for other functions of the working machine.

The hydraulic fluid supply 124 is here illustrated as a hydraulic tank 124. However, it is also possible to provide hydraulic fluid from a low pressure return flow as discussed herein, from a feeder pump or from an accumulator as will be illustrated in the following.

The first hydraulic machine 104 is further configured to recuperate energy if a requested pressure from the first hydraulic machine 104 is lower than a pressure in the first return line 122.

Figure 2:
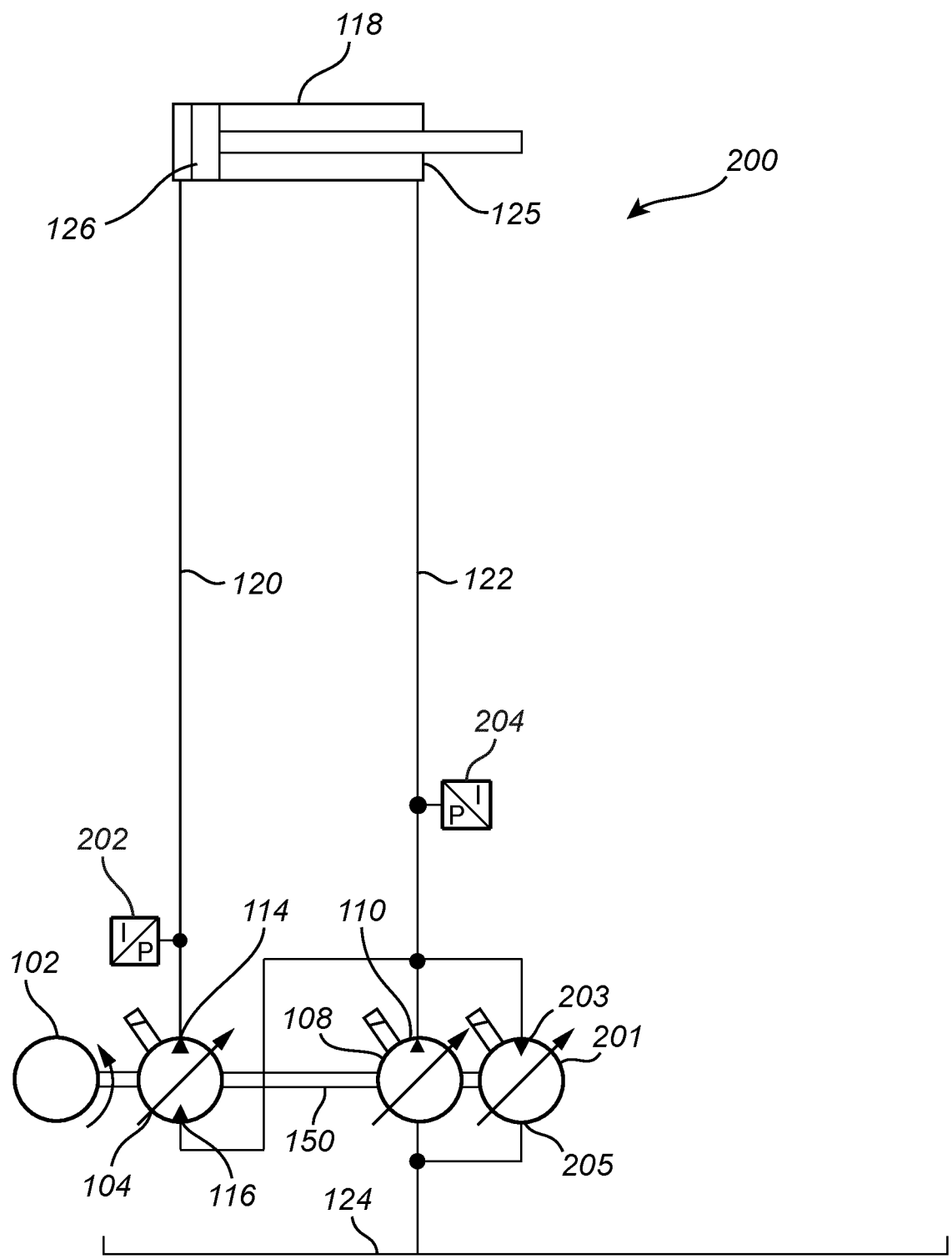
FIG. 2 is a schematic illustration of a hydraulic system according to an embodiment of the invention.

In the embodiment illustrated in FIG. 2, the hydraulic system 200 further comprises a third hydraulic machine 201 operatively connected to the common axle 150 of the electric machine 102. The second hydraulic machine 108 is here a variable displacement hydraulic machine with unidirectional flow configured to provide a variable flow from the output side 110 of the second hydraulic machine to the input side 116 of the first hydraulic machine 104. The third hydraulic machine 201 is a variable displacement hydraulic machine with unidirectional flow having an input side 203 connected to the output side of the second hydraulic machine, and thereby also to the return line 122 and to the input side 116 of the first hydraulic machine since the return line 122 is connected to each of the first second and third hydraulic machines 104, 108, 201. The third hydraulic machine 201 further comprises an output side 205 connected to the hydraulic fluid supply 124. The third hydraulic machine 201 is configured to recuperate energy if the requested flow from the first hydraulic machine 104 is lower than the flow of the first return line 122. In the hydraulic system 200 illustrated in FIG. 2, the functionality of the bi-directional hydraulic machine illustrated in FIG. 1 is thus provided by two separate hydraulic machines having a unidirectional flow. In other words, in the following description, the bi-directional hydraulic machine is functionally equivalent with the two unidirectional hydraulic machines.

In FIG. 2, it is further illustrated that the hydraulic system 200 comprises first pressure detection means 202 arranged to determine a pressure in the supply line 120 and second pressure detection means 204 arranged to determine a pressure in the first return line 122. The first and second pressure detection means 202, 204 may for example be pressure sensors arranged in the supply line 120 and first return line 122, respectively. Accordingly, the pressure of the supply line 120 may be determined by arranging a pressure sensor in the supply line. However, it is also possible to determine the pressure based on the properties and operating conditions of the first hydraulic machine 104. For example, assuming that the torque from the electric machine 102 is known, the pressure from the hydraulic machine 104 can be calculated based on the known displacement and known losses of the hydraulic machine 104.

Moreover, by knowing the pressure in the first return line 122 and/or in the supply line 120, the hydraulic machines can be controlled to operate as required. In principle, the hydraulic machines may be controlled independently of each other, where the third hydraulic machine is controlled to achieve optimized energy recuperation for the hydraulic consumers and where the first hydraulic machine is controlled to provide the pressure required for operating the consumers. However, the second hydraulic machine 108 is preferably further controlled to provide a minimum pressure required for the first hydraulic machine 104 to operate at high rpm. The first hydraulic machine 104 is thus dependent on the pressure in the first return line 122 and from the second hydraulic machine 108, since the pressure determines the maximum rpm possible for the first hydraulic machine 104.

Figure 3:
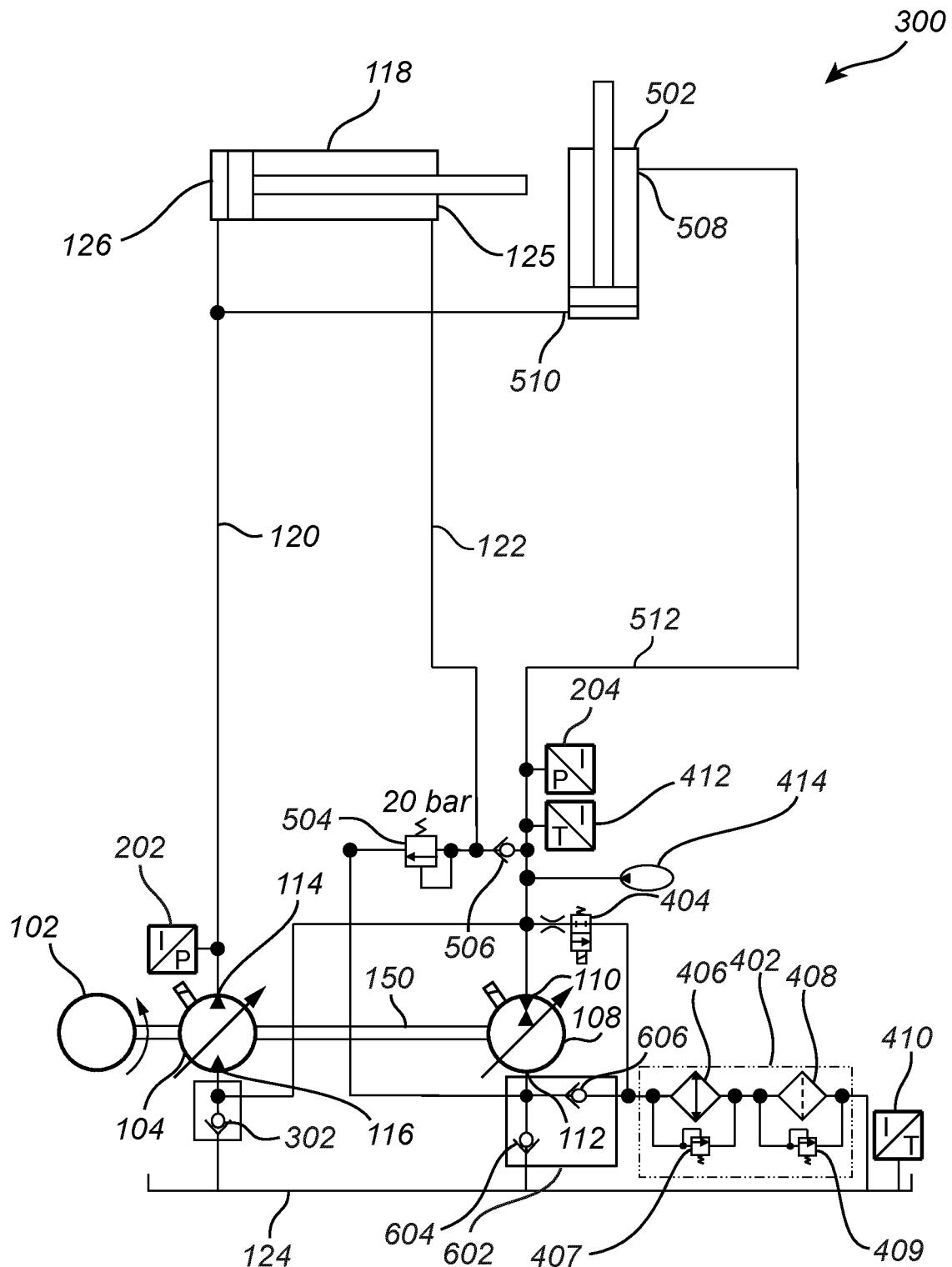
FIG. 3 is a schematic illustration of a hydraulic system according to an embodiment of the invention.

FIG. 3 schematically illustrates a hydraulic system 300 wherein the at least one hydraulic consumer comprises: a first hydraulic consumer 118 connected to the first return line 122, and a second hydraulic consumer 502 having a second return line 512 directly connected to the input side 116 of the first hydraulic machine 104, and thereby also to the input/output side 110 of the second hydraulic machine. The configuration of the first and second hydraulic machines 104, 108 is the same as described above with reference to FIG. 1.

The first return line 122 is connected from a first side 125 of the first hydraulic consumer 118 to the hydraulic fluid supply 124 via a pressure limiter 504 and to the input side 116 of the first hydraulic machine 104 via a valve arrangement 506 allowing a flow from the first return line 122 to the second return line 512. The pressure limiter 504 is configured to allow a flow from the first return line 122 to the hydraulic fluid supply 124 if the pressure in the first return line 122 is lower than the pressure in the second return line 512, and if the pressure of the first return line 122 is higher than a threshold pressure of the pressure limiter 504.

Furthermore, the pressure limiter 504 illustrated in FIG. 3 allows a flow from the first return 122 line to the tank 124 if the pressure in the first return line 122 is lower than the pressure in the second return line 512. The pressure in the first return line 122 must also be higher than the pressure level set by the pressure limiter 504 to produce a flow through the pressure limiter 504. The pressure limiter 504 provides a counter pressure for the first hydraulic cylinder 118 which is desirable in applications where a hydraulic cylinder needs a counter pressure to operate correctly. For example, if the first hydraulic cylinder 118 is a steering cylinder in a wheel loader, a counter pressure of approximately 20 bar may be desirable in order to provide the desirable steering function. Here, it should be noted that the drawings illustrate the general operating principles of the hydraulic system, and that in an actual system, further components such as valve blocks or the like may have to be arranged between the hydraulic consumers and the illustrated hydraulic system to achieve the correct flow directions from the hydraulic consumers to the return lines and further to the hydraulic machines.

The hydraulic system 300 further comprises a check valve 302 arranged between the input side 116 of the first hydraulic machine 104 and the hydraulic fluid supply 124, and between the output side 110 of the second hydraulic machine 108 and the hydraulic fluid supply 124, wherein the check valve 302 is configured to allow the first hydraulic machine 104 to access hydraulic fluid from the hydraulic fluid supply 124. As illustrated in FIG. 3, the check valve 302 is arranged to prevent hydraulic fluid from flowing from the input side 116 of first hydraulic machine 104, and also from the first return line 122 and the output side 110 of the second hydraulic machine 108, to the hydraulic fluid supply 124.

FIG. 3 further illustrates that the hydraulic system 300 comprises a reconditioning system 402 connected to the hydraulic fluid supply 124 and a reconditioning valve 404 arranged between the second return line 512 and the reconditioning system 402. The reconditioning valve 404 is configured to control a flow of hydraulic fluid from the second return line 512 to the reconditioning system 402. By means of the check valve 506 between the first return line 122 and the second return line 512, there may be a flow from the first return line 122 to the second return line 512 if the pressure of the first return line 122 is higher than the pressure of the second return line 512, thereby enabling a flow from the first return line 122 to the reconditioning system 402 under certain operating conditions.

The reconditioning valve 404 is here illustrated as an on/off valve but is also possible to use other types of valves. The illustrated reconditioning system comprises a hydraulic fluid cooler 406 and a hydraulic fluid filter 408. Each of the hydraulic fluid cooler 406 and a hydraulic fluid filter 408 is arranged in parallel with a corresponding pressure limiter 407, 409 to ensure that the pressure to the hydraulic fluid cooler 406 and a hydraulic fluid filter 408 is not too high.

Moreover, the hydraulic system 300 illustrated in FIG. 3 comprises a first temperature sensor 410 configured to determine the temperature of hydraulic fluid in the hydraulic fluid supply 124 and a second temperature sensor 412 arranged in the first return line to determine a temperature of hydraulic fluid in the second return line 512. The temperature sensors can be connected to a control functionality which in turn regulates the reconditioning valve 404 to control the flow of hydraulic fluid to e.g. the hydraulic fluid cooler 406 based on the temperature of the hydraulic fluid at the respective positions. In general, the aim is to cool the hydraulic if the temperature is higher than a predetermined temperature. Cooling is preferably performed in operating phases which create as low power losses as possible. However, if the temperature is too high, cooling must be done also in other phases that create higher power losses. Moreover, filtration of the hydraulic fluid is preferably related to the power consumption of the hydraulic system, since the hydraulic fluid will become more contaminated at higher power consumption. The hydraulic system 300 of FIG. 3 further comprises a hydraulic accumulator 414 connected to the second return line 512.

By means of the hydraulic accumulator 414, excess energy can be stored to be used later. The hydraulic accumulator 414 may for example be charged if the pressure of the second return line 512 is higher than the gas pre-charged pressure of the hydraulic accumulator and if the flow requested from the first hydraulic machine 104 is lower than the flow of the return line 122. Moreover, energy stored in the accumulator 414 can be used if the pressure of the hydraulic fluid in the accumulator 414 is higher than the pressure of the return line 122. Moreover, the accumulator 414 can be employed to provide a smoother operation of the hydraulic system where the accumulator 414 can be used in situations where the second hydraulic machine 108 is not capable of changing a supplied pressure sufficiently fast, meaning that the occurrence of pressure oscillations can be reduced.

FIG. 3 further illustrates that the pressure limiter 504 is connected to the input side 112 of the second hydraulic machine 108 and to the tank 124 via a check valve arrangement 602 comprising a first check valve 604 allowing the second hydraulic machine 108 to access hydraulic fluid from the tank 124 and a second check valve 606 allowing a flow of hydraulic fluid from the pressure limiter 504 to the tank 124. Moreover, the pressure limiter 504 is connected to the tank via the second check valve 606 and further via the reconditioning system 402. Thereby, a flow through the pressure limiter 504 can be used by the second hydraulic machine 108 or it can be provided to the reconditioning block 402 via the second check valve.

Figure 4:
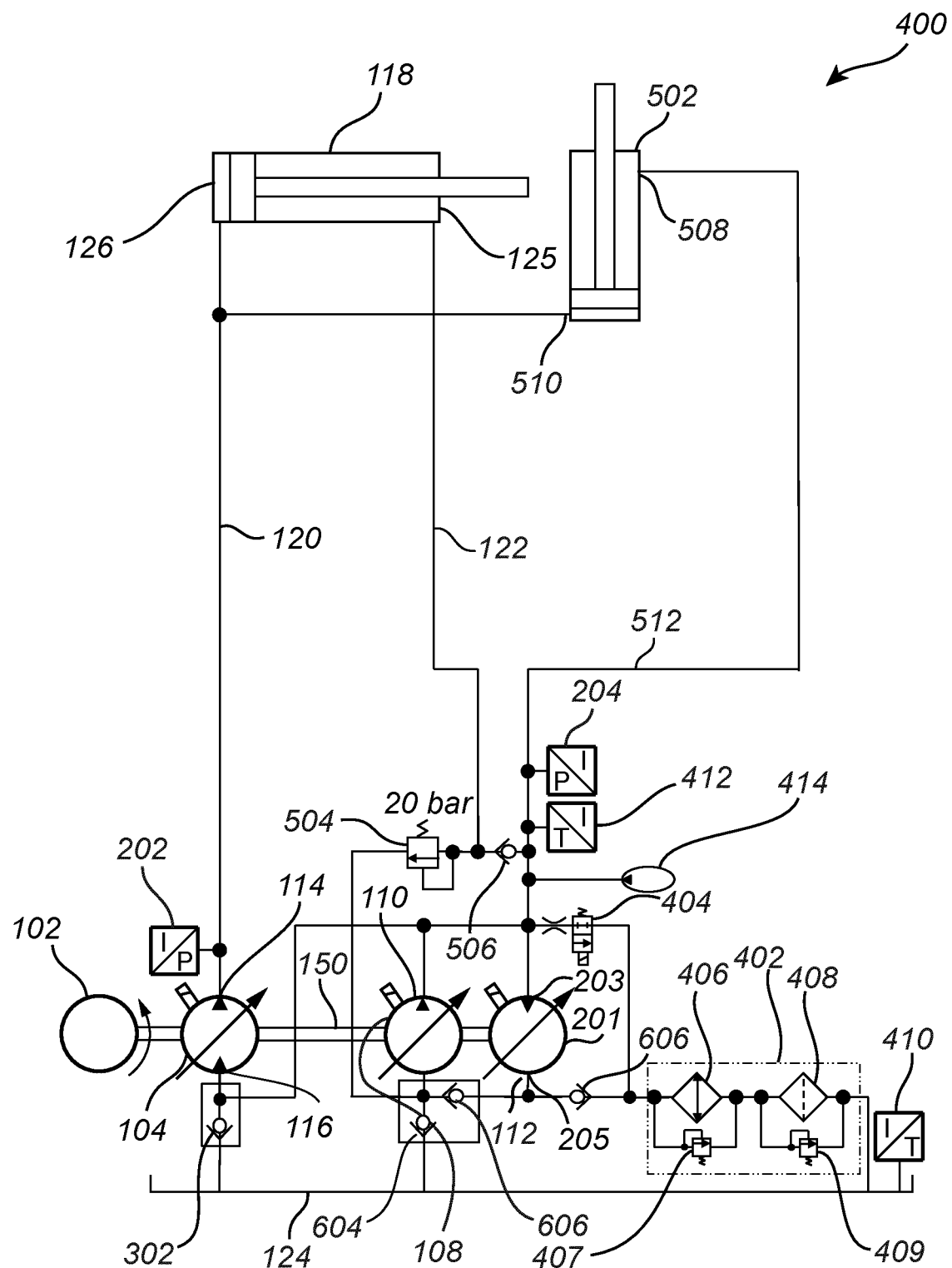
FIG. 4 is a schematic illustration of a hydraulic system according to an embodiment of the invention.

FIG. 4 illustrates a hydraulic system 400 similar to the system described able with reference to FIG. 3, but with the difference that the configuration of hydraulic machines is the same as described with reference to FIG. 2. Accordingly, the hydraulic system 400 of FIG. 4 comprises three hydraulic machines, where the second hydraulic machine 108 is a variable displacement hydraulic machine with unidirectional flow configured to provide a variable flow from the output side 110 of the second hydraulic machine, and the third hydraulic machine 201 is a variable displacement hydraulic machine with unidirectional flow having an input side 203 connected to the output side 110 of the second hydraulic machine as described in further detail with reference to FIG. 2.

Figure 5:
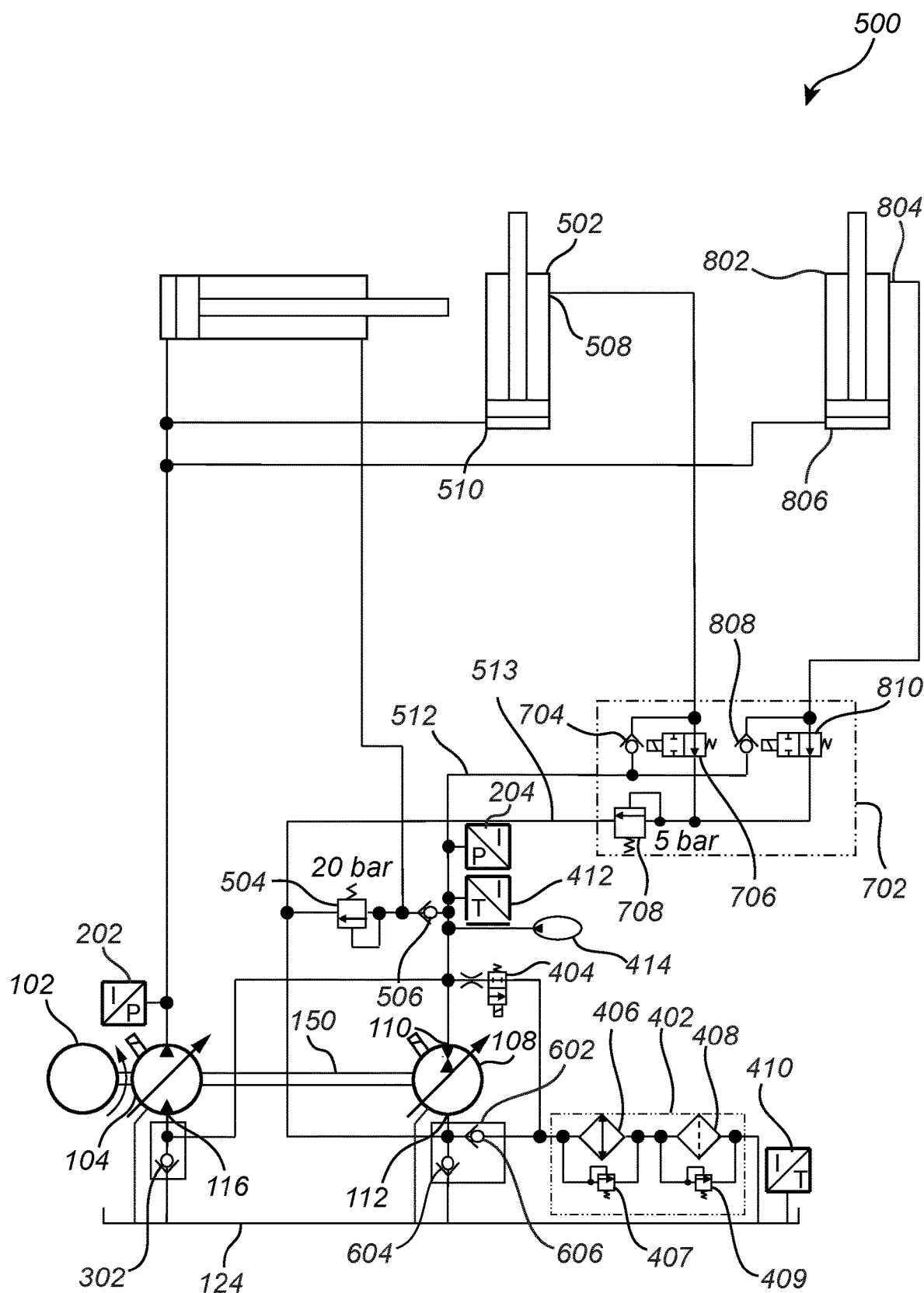
FIG. 5 is a schematic illustration of a hydraulic system according to an embodiment of the invention.

FIG. 5 illustrates a hydraulic system 500 where the configuration of the hydraulic machines is the same as in FIGS. 1 and 3. In FIG. 5, the system 500 further comprises a return valve block 702 connected to the piston rod side 508 of the second hydraulic cylinder 502. The return valve block 702 comprises a first return check valve 704 arranged to allow a flow from the piston rod side 508 of the second hydraulic cylinder 502 to the second return line 512 and a first control valve 706 controlling the flow from the piston rod side 508 of the second hydraulic cylinder 502 to a second pressure limiter 708 arranged between the piston rod side 508 of the second hydraulic cylinder 502 and the input side 112 of the second hydraulic machine 108. The second pressure limiter 708 is in turn connected to a third return line 513 which is connected to tank via the valve arrangement 602.

The hydraulic system 500 of FIG. 5 further comprises a third hydraulic cylinder 802 having a piston rod side 804 connected to the return valve block 702. The return valve block 702 of FIG. 5 further comprises a second return check valve 808 arranged to allow a flow from the piston rod side 804 of the third hydraulic cylinder 802 to the second return line 512 and a second control valve 810 controlling a flow from the piston rod side 804 of the third hydraulic cylinder 802 to the second pressure limiter 708. The first hydraulic consumer 118 may be a steering cylinder, the second hydraulic consumer 502 may be a lift cylinder and the third hydraulic consumer 802 may be a tilt cylinder of a working machine.

The return valve block 702 can be controlled so that the return flow to the tank 124 via the third return line 513 has a certain pressure determined by the pressure limiter 708, such as 5 bar. If the flow is instead controlled by the valves to go to the output side 110 of the second hydraulic machine 108 the pressure will be set by the second hydraulic machine 108. If the return flow is going to the tank 124 and if the second hydraulic machine 108 cannot supply enough flow, then the return oil from the second and third hydraulic cylinders 502, 802 will supply the first return line 122 with flow, i.e. the output side 110 of the second hydraulic machine 108, when the pressure falls down to 5 bar. The second hydraulic machine 108 may also access the tank 124 to provide a flow but the overall flow may thus be increased if also the flow from the first return line 122 is used.

An advantage of the described return valve block 702 is that is can easily be extended with additional valves to accommodate for additional hydraulic consumers.

It should be noted that the orientation of one or more of the illustrated hydraulic cylinders 118, 502, 802 may be reversed, i.e. such that the piston rod side of the hydraulic cylinder is connected to the supply line 120.

Figure 6:
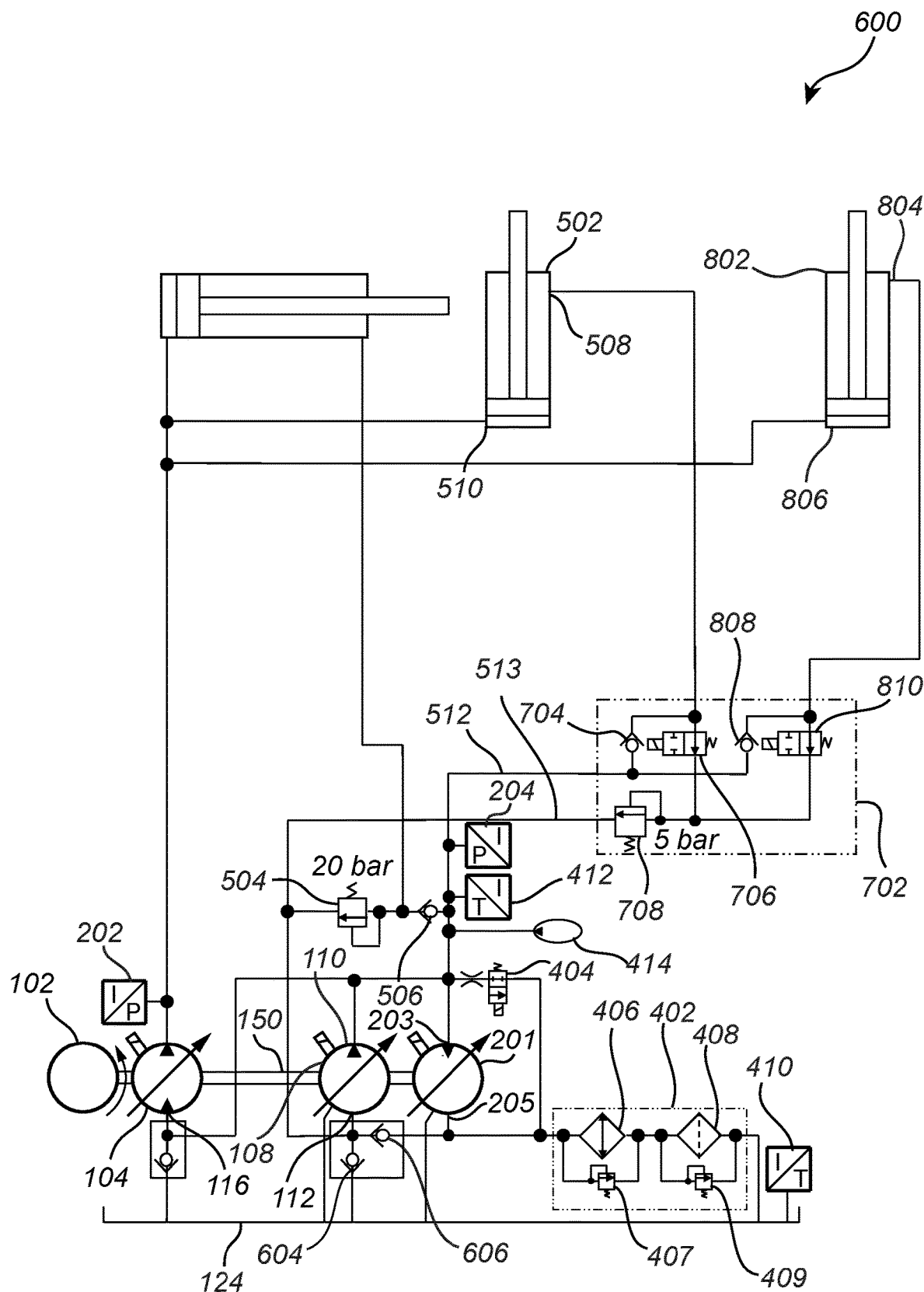
FIG. 6 is a schematic illustration of a hydraulic system according to an embodiment of the invention.

FIG. 6 illustrates a hydraulic system 600 where the configuration of the hydraulic machines is the same as in FIGS. 2 and 4, and where the hydraulic system comprises the return valve block 702 described above with reference to FIG. 5.

Figure 7:
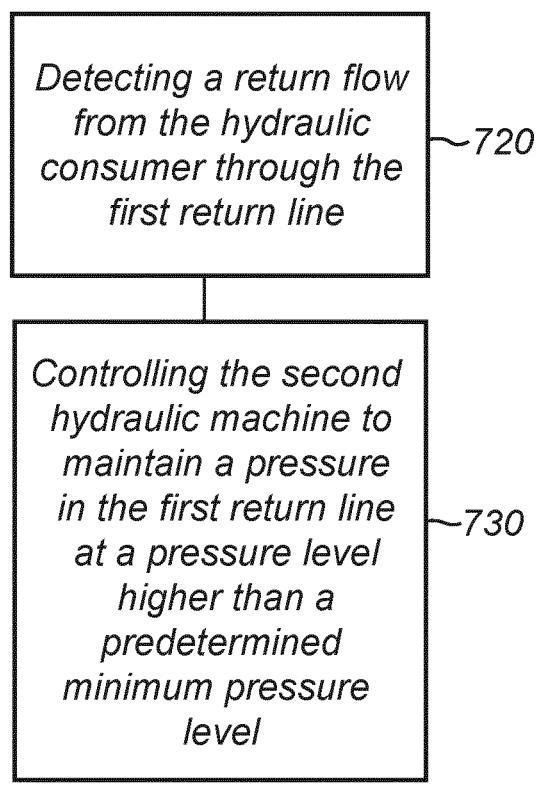
FIG. 7 is a flow chart outlining steps of a method according to an embodiment of the invention.

FIG. 7 is a flow chart outlining the general steps of a method according to an embodiment of the invention, wherein the method comprises detecting 720 a return flow from the first hydraulic cylinder 118 through the first return line 122 and controlling 730 the second hydraulic machine 108 to maintain a pressure in the first return line 122 at a pressure level higher than a predetermined minimum pressure level. The minimum pressure level may for example be 15 bar. The pressure of the return line 122 may for example drop due to internal system leakage, or if any other hydraulic consumer is connected to the return line. There may also be other functions drawing hydraulic fluid from the return line, such as reconditioning and/or cooling systems.

Figure 8A:
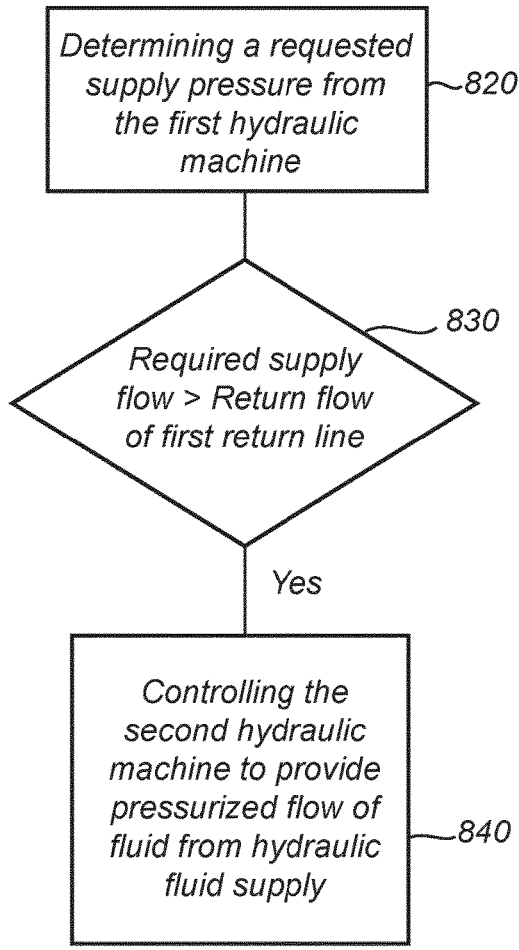
FIGS. 8A-B are flow charts outlining steps of a method according to an embodiment of the invention.

FIG. 8A is a flow chart outlining the general steps of a method further comprising: determining 820 a requested supply pressure from the first hydraulic machine; and if 830 the return flow of the first return line is lower than the supply flow required by the first hydraulic machine, controlling 840 the second hydraulic machine to provide a pressurized flow of hydraulic fluid from a hydraulic fluid supply 124 to the input side of the first hydraulic machine. The hydraulic consumer may send control signals in terms of a pressure to be provided by the first hydraulic machine 104 to the hydraulic consumer. The supply pressure which the first hydraulic machine 104 is able to provide is a function of the displacement of the hydraulic machine and the return flow in the first return line 122. Thereby, based on the requested supply pressure, it can be determined if the flow of the return line is sufficient for achieving the requested supply pressure or not.

Figure 8B:
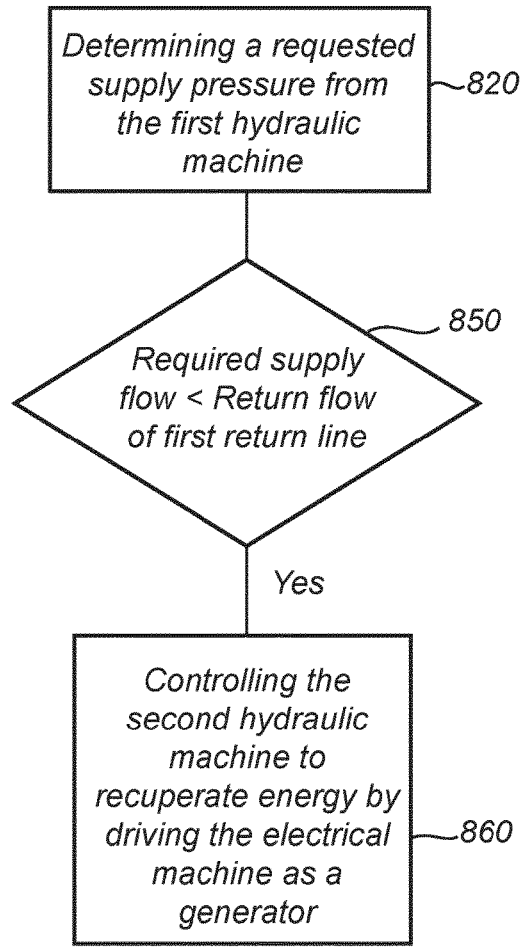

FIG. 8B is a flow chart outlining the general steps of a method further comprising determining 820 a requested supply pressure from the first hydraulic machine; and if 850 the return flow of the first return line 122 is higher than the supply flow required from the first hydraulic machine 104, controlling 850 the second hydraulic machine 108 to recuperate energy by driving the electric machine 102 as a generator.

The method of FIG. 8B is described with reference to the hydraulic systems illustrated in FIGS. 1, 3 and 5 comprising two hydraulic machines. The method of FIG. 8B may also be applied to the system having the configuration of hydraulic machines illustrated in FIGS. 2, 4 and 6 where it is the third hydraulic machine 201 which recuperates energy when there is an excess flow in the return line 122, since the return line is also connected to the input side 203 of the third hydraulic machine 201.

FIG. 9 shows a frame-steered working machine in the form of a wheel loader 901. The body of the wheel loader 901 comprises a front body section 902 and a rear body section 903, which sections each has an axle 912, 913 for driving a pair of wheels. The rear body-section 903 comprises a cab 914. The body sections 902, 903 are connected to each other in such a way that they can pivot in relation to each other around a vertical axis by means of two first actuators in the form of hydraulic cylinders 904, 905 arranged between the two sections. The hydraulic cylinders 904, 905 are thus arranged one on each side of a horizontal centerline of the vehicle in a vehicle traveling direction in order to turn the wheel loader 901.

The wheel loader 901 comprises an equipment 911 for handling objects or material. The equipment 911 comprises a load-arm unit 906, also referred to as a linkage, and an implement 907 in the form of a bucket fitted on the load-arm unit 906. A first end of the load-arm unit 906 is pivotally connected to the front vehicle section 902. The implement 907 is pivotally connected to a second end of the load-arm unit 906.

The load-arm unit 906 can be raised and lowered relative to the front section 902 of the vehicle by means of two second actuators in the form of two hydraulic cylinders 908, 909, each of which is connected at one end to the front vehicle section 902 and at the other end to the load-arm unit 906. The bucket 907 can be tilted relative to the load-arm unit 906 by means of a third actuator in the form of a hydraulic cylinder 910, which is connected at one end to the front vehicle section 902 and at the other end to the bucket 907 via a link-arm system 915.

It is to be understood that the present invention is not limited to the embodiments described above and illustrated in the drawings; rather, the skilled person will recognize that many changes and modifications may be made within the scope of the appended claims.

The invention claimed is:

1. A hydraulic system for a working machine, the system comprising:
  an electric machine connected to a first hydraulic machine and to a second hydraulic machine via a common axle, an output side of the second hydraulic machine being connected to an input side of the first hydraulic machine, wherein the first hydraulic machine is a variable displacement hydraulic machine with unidirectional flow;
  at least one hydraulic consumer hydraulically coupled to an output side of the first hydraulic machine via a supply line and configured to be powered by the first hydraulic machine;
  a first return line hydraulically coupling the hydraulic consumer to the input side of the first hydraulic machine;
  wherein the second hydraulic machine is configured to provide a flow of hydraulic fluid from a hydraulic fluid supply to the input side of the first hydraulic machine if a requested flow from the first hydraulic machine exceeds a flow of the first return line.

2. The hydraulic system according to claim 1, wherein the second hydraulic machine is a variable displacement hydraulic machine with bi-directional flow, the second hydraulic machine being further configured to recuperate energy if the requested flow from the first hydraulic machine is lower than the flow of the first return line.

3. The hydraulic system according to claim 1, further comprising a third hydraulic machine operatively connected to the common axle of the electric machine,
  wherein the second hydraulic machine is a variable displacement hydraulic machine with unidirectional flow configured to provide a variable flow from the output side of the second hydraulic machine, and
  wherein the third hydraulic machine is a variable displacement hydraulic machine with unidirectional flow having an input side connected to the output side of the second hydraulic machine and an output side connected to the hydraulic fluid supply, the third hydraulic machine being configured to recuperate energy if the requested flow from the first hydraulic machine is lower than the flow of the first return line.

4. The hydraulic system according to claim 2, wherein the at least one hydraulic consumer comprises:
  a first hydraulic consumer connected to the first return line, and
  a second hydraulic consumer having a second return line directly connected to the input side of the first hydraulic machine, and
  wherein the first return line is connected from a first side of the first hydraulic consumer to the hydraulic fluid supply via a pressure limiter and to the input side of the first hydraulic machine via a valve arrangement allowing a flow from the first return line to the second return line,
  wherein the pressure limiter is configured to allow a flow from the first return line to the hydraulic fluid supply if the pressure in the first return line is lower than the pressure in the second return line, and if the pressure of the first return line is higher than a threshold pressure of the pressure limiter.

5. The hydraulic system according to claim 4, further comprising a return valve block connected to a first side of the second hydraulic consumer, the return valve block comprising a first return check valve arranged to allow a flow from the first side of the second hydraulic consumer to the second return line and a first control valve controlling the flow from the first side of the second hydraulic consumer to a second pressure limiter arranged between the first side of the second hydraulic consumer and the input side of the second hydraulic machine.

6. The hydraulic system according to claim 5, further comprising a third hydraulic consumer having a first side connected to the return valve block, wherein the return valve block further comprises a second return check valve arranged to allow a flow from the first side of the third hydraulic consumer to the second return line and a second control valve controlling a flow from the first side of the third hydraulic consumer to the second pressure limiter.

7. The hydraulic system according to claim 6, wherein the first hydraulic consumer is a steering cylinder, the second hydraulic consumer is a lift cylinder and the third hydraulic consumer is a tilt cylinder of a working machine.

8. A working machine comprising a hydraulic system according to claim 1.

9. A method for controlling a hydraulic system for a working machine, the system comprising:
  an electric machine connected to a first hydraulic machine and to a second hydraulic machine via a common axle, an output side of the second hydraulic machine being connected to an input side of the first hydraulic machine, wherein the first hydraulic machine is a variable displacement hydraulic machine configured to provide unidirectional flow;

at least one hydraulic consumer hydraulically coupled to an output side of the first hydraulic machine via a supply line and configured to be powered by the first hydraulic machine;

a first return line hydraulically coupling the hydraulic consumer to the input side of the first hydraulic machine;

wherein the method comprises:

detecting a return flow from the hydraulic consumer through the first return line; and controlling the second hydraulic machine to maintain a pressure in the first return line at a pressure level higher than a predetermined minimum pressure level.

10. The method according to claim 9, further comprising:

determining a requested supply pressure from the first hydraulic machine; and if the return flow of the first return line is lower than the supply flow required by the first hydraulic machine, controlling the second hydraulic machine to provide a pressurized flow of hydraulic fluid from a hydraulic fluid supply to the input side of the first hydraulic machine.

11. The method according to claim 9, further comprising:

determining a requested supply pressure from the first hydraulic machine; and if the return flow of the first return line is higher than the supply flow required from the first hydraulic machine, controlling the second hydraulic machine to recuperate energy by driving the electric machine as a generator.

12. The method according to claim 9, in a system further comprising a third hydraulic machine connected to the common axle of the electric machine, wherein the second hydraulic machine is a unidirectional variable displacement hydraulic machine configured to provide a variable positive displacement at the output side of the second hydraulic machine and wherein the third hydraulic machine is a unidirectional variable displacement hydraulic machine having an input side connected to the output side of the second hydraulic machine and an output side connected to the hydraulic fluid supply, the method further comprising:

determining a requested supply pressure from the first hydraulic machine; and if the return flow of the first return line is lower than the supply flow required by the first hydraulic machine, controlling the second hydraulic machine to provide a pressurized flow of hydraulic fluid from a hydraulic fluid supply to the input side of the first hydraulic machine.

13. The method according to claim 12, further comprising:

determining a requested supply pressure from the first hydraulic machine; and if the return flow of the first return line is higher than the supply flow required from the first hydraulic machine, controlling the third hydraulic machine to recuperate energy by driving the electric machine as a generator.

14. The method according to claim 9, wherein the at least one hydraulic consumer comprises a first hydraulic cylinder connected to the first return line and wherein the hydraulic system further comprises second and third hydraulic cylinders connected to a return valve block configured and arranged to control the return flow direction from the second and third hydraulic cylinders to the second hydraulic machine, the return valve block being coupled to a second return line connected to the input side of the first hydraulic machine and to the input side of the second hydraulic machine, the return valve block being further coupled to a third return line connected to the low-pressure side of the second hydraulic machine, wherein the method further comprises:

controlling the return valve block based on operating properties of the first, second and/or third hydraulic cylinder such that energy is recovered by the second hydraulic machine.

15. The method according to claim 12, wherein the at least one hydraulic consumer comprises a first hydraulic cylinder connected to the first return line and wherein the hydraulic system further comprises second and third hydraulic cylinders connected to a return valve block configured and arranged to control the return flow direction from the second and third hydraulic cylinders to the second hydraulic machine, the return valve block being coupled to a second return line connected to the input side of the first hydraulic machine and to the input side of a third hydraulic machine, the return valve block being further coupled to a third return line connected to an input side of the second hydraulic machine, wherein the method further comprises:

controlling the return valve block based on operating properties of the first, second and/or third hydraulic cylinder such that energy is recovered by the third hydraulic machine.

* * * * *